April 25, 1933.  P. C. WEGO  1,905,666
SEALED BEARING
Filed Jan. 2, 1930
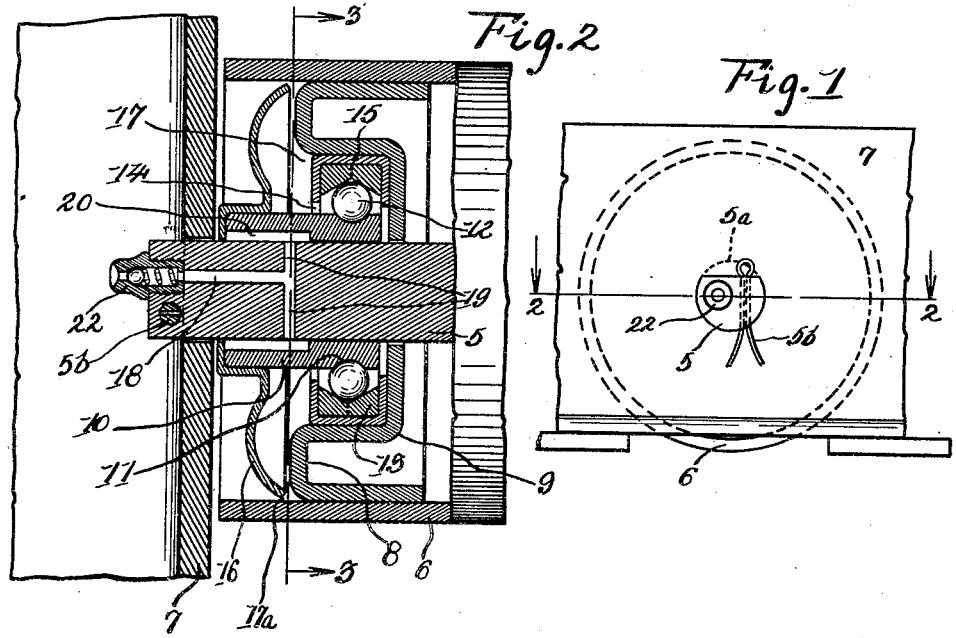
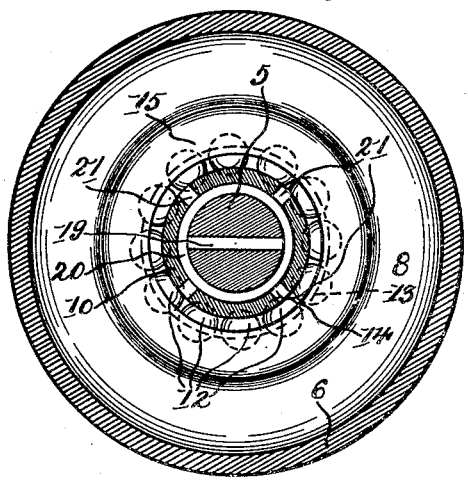
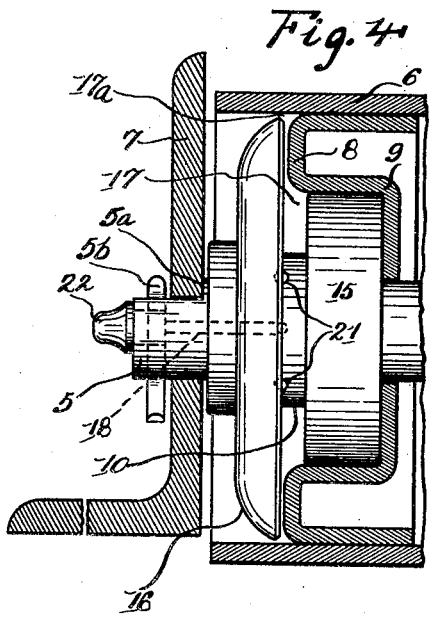
Inventor
Peter C. Wego
By Stryker & Stryker
Attorneys Patented Apr. 25, 1933 1,905,666

UNITED STATES PATENT OFFICE

PETER C. WEGO, OF ST. PAUL, MINNESOTA, ASSIGNOR TO STANDARD CONVEYOR COMPANY, OF NORTH ST. PAUL, MINNESOTA, A CORPORATION OF MINNESOTA

SEALED BEARING

Application filed January 2, 1930. Serial No. 417,891.

This invention relates to bearings particularly, although not exclusively, adapted for use in conveyor rollers where sealing against the entry of harmful foreign matter into the bearing is desirable. The present invention is an improvement upon the lubricating means for conveyor rollers described and claimed in my Patent No. 1,737,036, dated November 26, 1929.

It is my object to provide improved means for sealing the bearing by the use of a suitable heavy lubricant or grease. More particularly, it is my object to provide a novel arrangement of grease passages, chamber and closure cap whereby the bearing may be efficiently sealed with grease and thorough flushing or expelling of the old grease and grit or other foreign matter is effected without leaving pockets near the bearing containing grit or soiled grease.

The invention will be best understood by reference to the accompanying drawing in which Figure 1 is an end view of a conveyor roller together with its supporting rail, the latter being shown in fragmentary side view; Fig. 2 is a horizontal section taken on the line 2—2 of Fig. 1; Fig. 3 is a section taken transversely of the axis of the roller on the line 3—3 of Fig. 2 and Fig. 4 is a vertical section through the roller body and support together with my improved bearing.

A non-revoluble shaft 5 extending axially through a roller body 6 is mounted between supporting side rails 7, as described in my Patent No. 1,737,036. Although only one end of the roller body is illustrated, it is to be understood that the construction is duplicated at each end, except that the axial shaft 5 may be freely inserted in a perforation in the supporting rail at one end and secured by shoulder 5a and cotter pin 5b at its other end.

A head 8, which is fixed at a predetermined point within an end of the roller body 6, is offset inward to provide a cup 9 for a bearing case 15. A sleeve 10 having a race-way 11 near its inner end for a number of anti-friction balls 12 is adapted to fit snugly upon the shaft 5. An outer raceway for the balls 12 is provided by a split-ring 13 and lubricant is admitted to the bearing through an annular opening 14 around the sleeve 10.

A closure cap 16 fits snugly on the outer end of the sleeve 10 and is offset inward from the end of the roller body 6. This cap 16 together with the head 8 and bearing cup 9 constitutes a lubricant chamber 17 having a narrow, annular outlet opening 17a at the outer periphery of the cup and within the roller body.

Extending longitudinally in the shaft 5 is a lubricant passage 18 having transverse branches 19 communicating, at opposite sides of the shaft 5, with an annular recess 20 in the inner periphery of the sleeve 10. As best shown in Fig. 3, radial outlet openings 21 for the recess 20 are spaced at regular intervals around the sleeve 10 so as to distribute grease uniformly within the annular grease chamber 17. The passage 18 has an inlet opening at the end of the shaft 5 where it communicates with a suitable grease supply nipple 22 having a spring-pressed closure of well known type. As best shown in Fig. 2, the passage 18 is located somewhat to one side of the center of shaft 5 to allow for the insertion of the cotter pin 5b.

In use, lubricant under pressure may be forced into nipple 22 and through passages 18 and 19 to recess 20 and from the latter through openings 21 into chamber 17. Efficient sealing is promoted by constructing cap 16 with such diameter that only sufficient clearance is left at opening 17a to enable the roller to revolve freely. As grease is forced into the chamber 17 it displaces the old or soiled grease, together with any grit which may have worked into the outer part of the chamber, out through the opening 17a. By uniformly distributing the fresh grease about the inner periphery of the chamber 17 efficient flushing of the chamber is insured.

The annular recess 20 obviates the necessity of accurately registering the outlets through the sleeve with branch passages 19. Furthermore, this construction makes it unnecessary to weaken the shaft by drilling a plurality of cross passages in order to provide a series of delivery openings into chamber 17.

Having described my invention what I claim as new and desire to protect by Letters Patent is:

1. In a bearing for a roller having a revoluble body and a bearing recess in an end of said body, an axial support projecting into said recess, said support comprising an axial shaft and a sleeve on said shaft, a bearing on said sleeve in said recess, an annular closure cap for said bearing recess fixed on said sleeve and having an opening for the escape of lubricant extending around its outer periphery within said roller body and a passageway for lubricant extending longitudinally in said axial shaft and having branch passageways in said sleeve opening between said cap and bearing at a plurality of points spaced around the periphery of said support, said passageways and branches being adapted to receive lubricant from an opening in the outer end of said axial support.

2. The combination with a roller body and support at an end thereof, said body having a bearing recess in said end, a cylindrical support projecting from said first mentioned support into said recess, a bearing for the roller mounted within said recess on said cylindrical support, said cylindrical support being formed with an annular recess and peripheral openings arranged to distribute lubricant from said recess to a number of spaced points around the periphery of said cylindrical support, means for delivering lubricant to said annular recess and a closure cap supported on said cylindrical support and fitting snugly thereon, said cap having its outer periphery disposed adjacent to the inner periphery of said roller body and having a restricted, annular opening at its outer periphery for the escape of lubricant from said openings.

3. The combination with a roller body and support at an end thereof, said body having a bearing recess in said end, a cylindrical, axial support projecting from said first mentioned support into said recess, said support comprising an axial shaft and a sleeve thereon, a bearing for the roller mounted within said recess on said sleeve, said sleeve being formed with an annular recess adjacent to said shaft and peripheral openings arranged to distribute lubricant from said recess to a number of spaced points around the periphery of said axial sleeve, means for delivering lubricant to said annular recess and a closure cap supported on said axial sleeve and fitting snugly thereon, said cap having its outer periphery disposed adjacent to the inner periphery of said roller body and having a restricted, annular opening at its outer periphery for the escape of lubricant from said openings.

In testimony whereof, I have hereunto signed my name to this specification.

PETER C. WEGO.